April 10, 1956  D. W. BARKLEY  2,741,156
REARVIEW MIRROR ASSEMBLY
Filed May 27, 1949  2 Sheets-Sheet 2

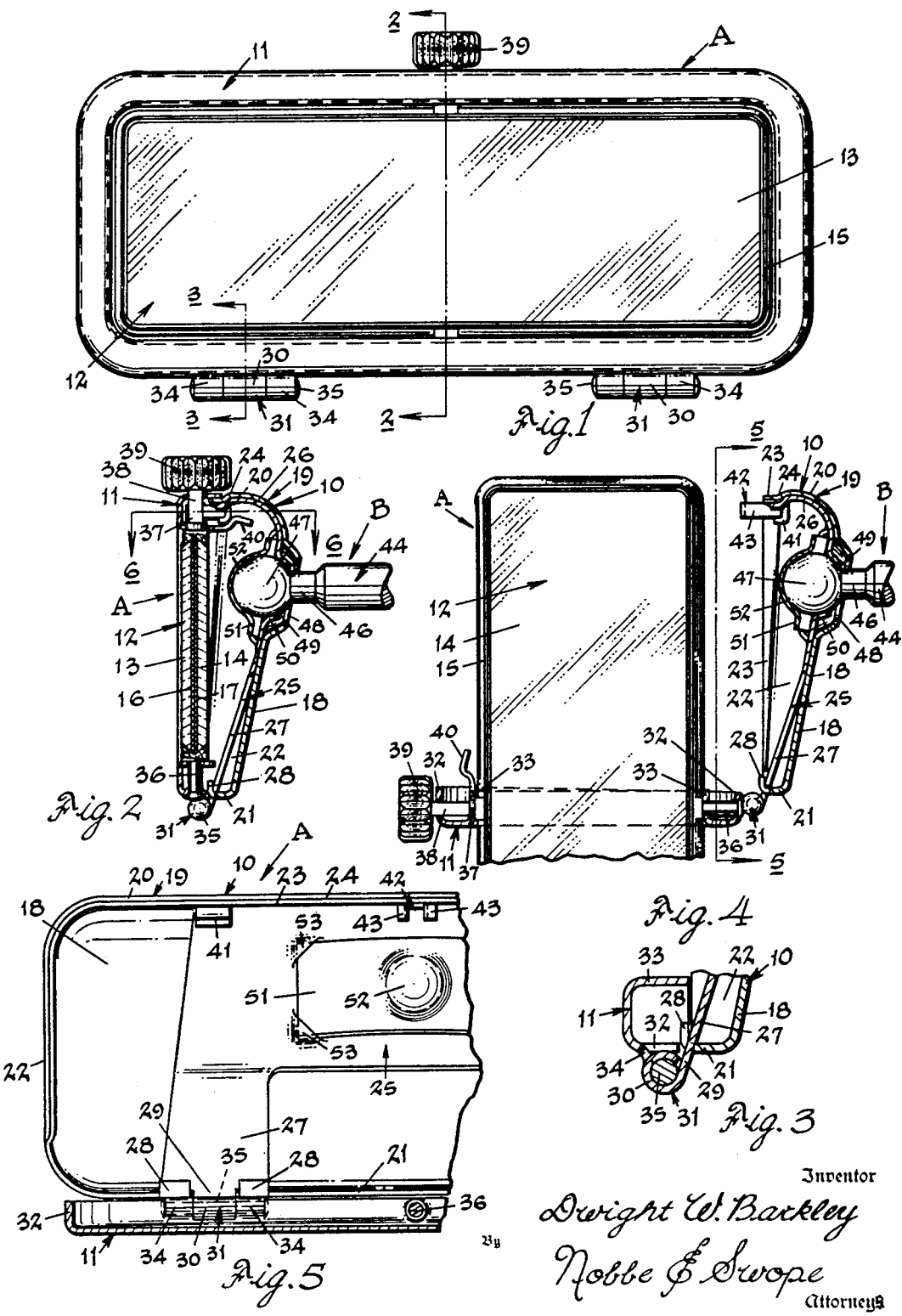

Inventor
Dwight W. Barkley
By
Nobbe & Swope
Attorneys

United States Patent Office 2,741,156
Patented Apr. 10, 1956

2,741,156
REARVIEW MIRROR ASSEMBLY

Dwight W. Barkley, Cheswick, Pa., assignor to Libbey-Owens-Ford Glass Company, Toledo, Ohio, a corporation of Ohio Application May 27, 1949, Serial No. 95,741

8 Claims. (Cl. 88—77)

The present invention relates to rear view mirrors such as employed in automobiles and the like, of the character which enables the driver of the vehicle to have a clear view of the rear road conditions at all times.

More particularly, this invention has to do with that type of rear view mirror having two reflective surfaces of different reflecting power and being reversible so that either surface may be brought into operative position by the driver of the vehicle; one reflective surface being in the form of an ordinary mirror for use in day driving and the other providing a mirror for night driving which will reduce the brilliancy of the reflecting headlights of an automobile approaching from the rear.

A primary object of the invention is the provision of a rear view mirror of the above type embodying means of a novel and improved character which will enable the driver to reverse the mirror in a rapid, efficient manner and with a minimum of care and attention on his part.

Another object of the invention is the provision of a rear view mirror embodying a supporting housing or case with which the mirror proper is both hingedly and rotatably associated so that it is capable of being readily reversed to selectively bring either of the reflecting surfaces into the line of vision of the driver, depending upon whether the mirror is to be used for day driving or night driving.

Another object of the invention is the provision of a rear view mirror assembly embodying a case having hinged thereto an open frame in which is rotatably mounted a reversible rear view mirror unit; the several parts being so associated with one another as to provide a simple, compact arrangement which may be easily actuated by the driver of the vehicle to remove the frame from engagement with the case and substantially simultaneously reverse the mirror unit.

A further object of the invention is the provision of cooperating means carried by the case and mirror frame for maintaining the frame against accidental displacement from its normal operating position, together with means for locking the mirror unit against accidental rotation within the frame.

A still further object of the invention is the provision of a rear view mirror assembly of the above character, in combination with means for supporting the same upon the structure of a vehicle for bodily adjustment relative to its supporting structure to bring the mirror unit to any desired angular position to accommodate persons of different height and seating position.

Other objects and advantages of the invention will become more apparent during the course of the following description, when taken in connection with the accompanying drawings.

In the drawings, wherein like numerals are employed to designate like parts throughout the same:

Fig. 1 is a front elevation of a rear view mirror constructed in accordance with the invention;

Fig. 2 is a vertical transverse section taken substantially on line 2—2 of Fig. 1;

Fig. 3 is a detail section taken substantially on line 3—3 of Fig. 1;

Fig. 4 is a transverse section of the mirror substantially as shown in Fig. 2, but with the mirror unit partially reversed;

Fig. 5 is a vertical section taken substantially on line 5—5 of Fig. 4;

Figure 7:
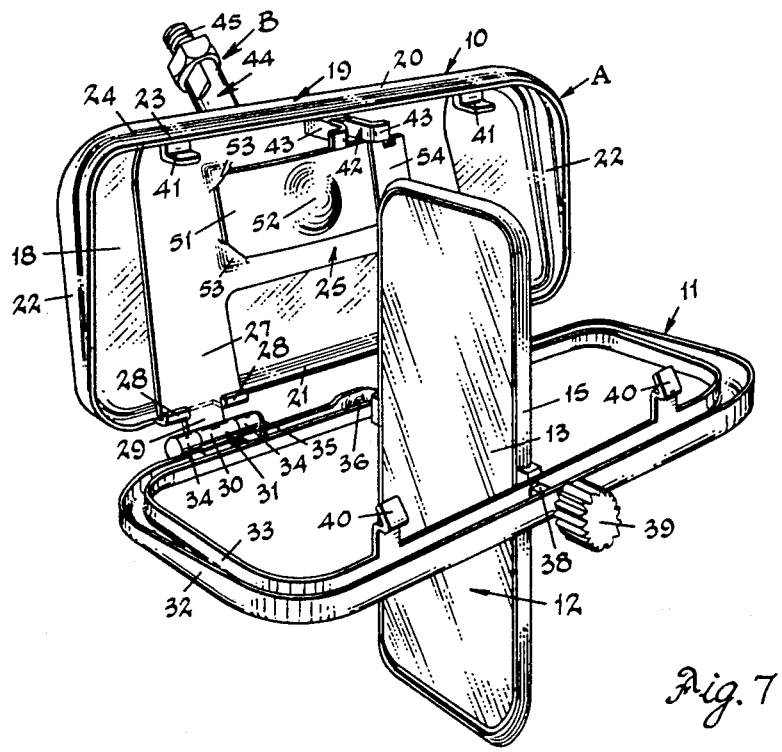
Fig. 7 is a perspective view of the mirror assembly showing the mirror unit partially reversed.

Referring more particularly to the drawings, there is shown a rear view mirror constructed in accordance with the invention, and which is designated in its entirety by the letter A. The mirror assembly A comprises generally a case 10, which may be adjustably supported in an automobile or the like by any conventional or preferred mounting means B, and an open frame 11, hingedly connected to the case and within which is mounted a reversible mirror unit 12.

Although the invention is not limited to the use of any specific type of reversible mirror unit 12, it may be composed, as herein shown, of two mirror elements 13 and 14 arranged back to back and mounted in a bezel 15. The mirror elements 13 and 14 have the inner, adjacent surfaces thereof provided with suitable reflective coatings 16 and 17 respectively, of different reflecting values, with one mirror coating being highly reflecting and suitable for daytime driving and the other mirror coating having a lower reflecting value suitable for nighttime driving. The mirror unit 12 is rotatably mounted in such a way that either mirror element may be selectively brought by the driver of the vehicle into operative position in his line of vision.

The bezel 15 of mirror unit 12 is rotatably mounted intermediate its ends within the frame 11 which is, in turn, hinged to the supporting case 10. The case 10 is substantially rectangular and comprises a rear wall 18 having a forwardly bent peripheral flange 19 including a top wall 20, bottom wall 21 and opposite end walls 22. The top wall 20 is preferably of relatively greater width than the bottom wall 21, with the end walls 22 gradually decreasing in width from the top wall to the bottom wall. The top wall is preferably increased to provide a relatively narrow rim 23, resulting in the formation of a shoulder 24 which continues downwardly in the end walls 22, the decreasing width of the said end walls resulting in the rim 23 gradually merging into the edge line of the peripheral flange 19 adjacent the bottom wall 21.

Received within the case 10 is a liner plate 25 which is generally formed along its upper edge to conform to the contour of the interior of the case and to interfit snugly therewith. More particularly, the upper edge portion 26 of liner plate 25 is so located with reference to the top wall 20 of the case that it engages the inner surface of the rim 23 and shoulder 24 thereof. The liner plate is formed with a pair of spaced leg portions 27 which extend downwardly to and are received in back of spaced, upstanding lugs 28 struck from the bottom wall 21 of the case.

In assembling the liner plate 25 within case 10, the legs 27 thereof are set against the lugs 28 and the body portion of the plate urged inwardly until the upper edge portion 26 thereof snaps beneath and behind the shoulder 24. Each leg 27 of the liner plate is provided between the lugs 28 with a centrally disposed depending tongue 29, the lower end of which is rolled, or otherwise formed, to provide the central part 30 of a hinge 31 by which the frame 11 is hingedly connected to the case.

Figure 6:
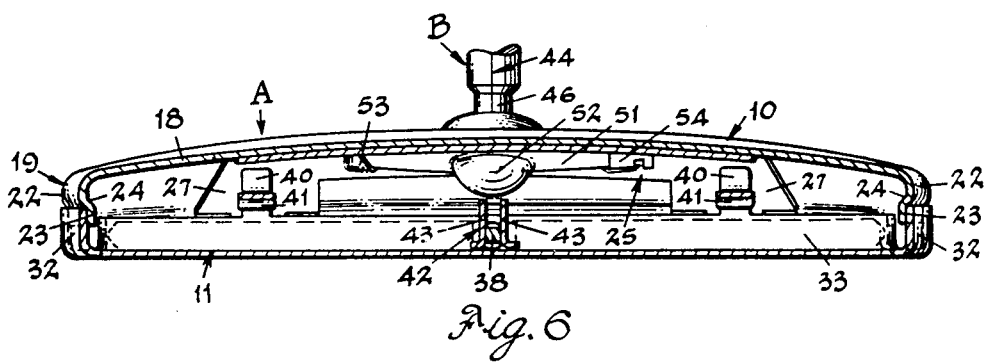
Fig. 6 is a horizontal section taken substantially on line 6—6 of Fig. 2.

The frame 11 is also generally rectangular in keeping with the shape of the case 10 and is of substantially U-shape or channel formation in cross section. The flanges 32 and 33 of the channel constitute the outer and inner walls respectively of the frame and are so shaped that when the frame is in closed or operative position with respect to the case, the outer wall 32 of the frame fits over the rim 23 of the case, with the edges of the frame wall 32 engaging the shoulder 24 in close, abutting relation as clearly shown in Figs. 2 and 6. The outer wall 32 of the frame, opposite the bottom wall 21 of the case, has struck therefrom tabs 34 which provide the component parts of the hinges 31. These tabs may likewise be rolled or otherwise formed to cooperate with the central parts 30 of the hinges 31 to receive pintles 35 whereby the hinges are completed and the frame free to swing relative to the case. When in closed position, the nesting association of the frame wall 32 with rim 23 of the case provides a smooth, pleasing external appearance for the mirror assembly.

The bezel 15 is rotatably mounted within the frame 11 by means of stub axles 36 and 37 which are journaled in the outer and inner walls 32 and 33 respectively of the frame. The stub axles are suitably secured to the bezel intermediate its ends so as to permit partial or complete rotation of the bezel within the confines of the frame to enable the mirror to be easily and quickly turned end for end. The stub axle 37 is formed with a square shank portion 38 which extends through the outer wall 32 of the frame and has fixed thereto a hand knob 39 or other suitable finger grip which provides a simple means for rotating the mirror unit as well as a means for withdrawing the frame 11 from its nesting relation with the case 10.

When the frame is in closed position with respect to the case, as shown in Figs. 1 and 2, it is maintained in such position by a snap latch arrangement which serves to hold the frame firmly against vibration or accidental separation from the case. Such latching arrangement comprises spring fingers 40 extended from the inner wall 33 of the frame and which engage complementary lugs 41 struck from the liner plate 25. Preferably the lugs 41 extend downwardly and forwardly to depress the fingers 40 as the said fingers snap beneath the lugs.

Provision is also made for locking the mirror against accidental rotation when the frame 11 is in nesting relation with reference to the case 10. For this purpose, a keeper member 42 is carried by the liner plate 25 to project outwardly beneath the top wall 20 of the case and into the path of the square shank portion 38 on stub axle 37. The spaced resilient fingers 43 of the keeper member 42 extend in substantially parallel relation to each other and act to frictionally grip opposed surfaces of the square shank portion 38 when the frame 11 is moved to its closed position.

When it becomes necessary or desirable to reverse the positions of the mirror elements 13 and 14, the hand knob 39 is employed by the driver to accomplish two simultaneously acting purposes. Thus, in pulling the knob forwardly, the fingers 40 are disengaged from lugs 41 to permit forward and downward swinging movement of the frame 11 with respect to the case 10 and simultaneously the square shank 38 will be released from the keeper 42 to permit turning of the mirror unit. Therefore, as the frame swings forwardly and downwardly, the driver can simultaneously rotate the mirror unit to present the desired mirror element to the driver.

Return of the frame 11 into nesting or closed association with the case 10 reestablishes the latch arrangement of the fingers 40 and lugs 41 so that the frame will be firmly retained until again moved therefrom. During this returning action, the desired mirror element will be located in the outer or viewing position and the square shank 38 so disposed that the keeper member 42 will engage the sides thereof to prevent accidental turning of the bezel.

Another important feature of the rear view mirror herein provided is that the rear wall 18 of the case 10 acts as a cover for the mirror surface facing said rear wall to shield the same from the headlights of oncoming vehicles and thereby prevent incidental reflections in the windshield of the vehicle created by oncoming traffic. Thus, the out-of-vision reflecting surface is normally in a position to receive light rays that may originate in approaching car lights, sunlight, and reflections from either source. These light rays can and will, unless the mirror is shielded therefrom, be reflected back toward the windshield of the vehicle and create disturbing sources of conflicting light or areas of scattered light therefrom which may materially interfere with driving safety and comfort. The rear wall 18 of the case in serving as a cover for the adjacent reflecting surface of the mirror prevents such incidental reflections.

Preferably, the mirror assembly is supported within an automobile in a manner that it can be bodily adjusted to any desired angular position to reflect images from the rear of the vehicle to the driver according to his height and seating position. The mounting means B, herein shown, is one form of adjustable mounting which may be used and comprises an arm 44 which is secured to the frame of an automobile by means of its threaded shank 45. Opposite the threaded shank 45, the arm 44 is provided with a shank 46 of reduced diameter which terminates in a spherical or ball end 47. As shown, the shank 46 of the arm extends through an opening 48 in the rear wall of the case 10 and a complementary opening 49 in the liner plate 25. The ball 47 is mounted in a spherical bearing or seat 50 formed in the said liner plate in alignment with the openings 48 and 49. The ball is retained in this seat by a metal strap 51 having a centrally formed bearing surface 52 conforming to and engaging said ball. The metal strap 51 is suitably secured at its opposite ends to the liner plate 25 as indicated at 53 and 54. The bearing surfaces 50 and 52 of the liner plate and strap respectively thus coact to grip the ball 47 of the mounting arm 44 with sufficient force to maintain the entire mirror assembly stationary except when it is adjusted bodily upon the ball 47.

From the foregoing, it will be apparent that the rear view mirror assembly of this invention provides a simply constructed, compact arrangement of coacting parts. In reversing the mirror elements when it becomes desirable or necessary to change from the reflective coating adapted for daytime driving to the reflective coating designed for night driving, or vice versa, the driver of the automobile need only grasp the hand knob 39 and pull it in an outward and downward direction relative to the case 10. In so doing, the frame 11 and mirror unit 12 are swung away from the case to permit rotation of the mirror unit by means of the knob to reverse the mirror elements. The entire operation necessitates little attention on the driver's part and he is assured perfect use of the viewing field of the selected mirror element when the hand knob is used to return the frame into its closed relation with the case.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a reversible rear view mirror for automobiles and the like; a substantially rectangular supporting case having a rear wall provided with mounting means for attachment of said case to a portion of the automobile and for supporting the mirror in functional position in the automobile, the rear wall of said case serving as a shield against headlights of oncoming vehicles when the mirror is mounted in functional position in the automobile, said case further including a forwardly directed peripheral flange comprising a top wall, bottom wall, and opposite end walls; a substantially rectangular open frame hinged to the bottom wall of the case for swinging movement toward the same into engagement with the rear wall thereof and away therefrom into open position, said frame when moved to closed position covering the front of the case and overlapping the top wall thereof; a substantially rectangular mirror unit swingably mounted within the frame and rotatable about a transverse axis located substantially intermediate the ends thereof, said mirror unit normally closing the front of the case and having two oppositely facing reflective surfaces of different reflecting values; and manually operable means carried by the frame and connected to the mirror unit for substantially simultaneously disengaging the frame from the case, rotating the mirror unit within the frame and returning the frame into engagement with the case.

2. In a reversible rear view mirror for automobiles and the like; a substantially rectangular supporting case having a rear wall provided with mounting means for attachment of said case to a portion of the automobile and for supporting the mirror in functional position in the automobile, the rear wall of said case serving as a shield against headlights of oncoming vehicles when the mirror is mounted in functional position in the automobile, said case further including a forwardly directed peripheral flange comprising a top wall, bottom wall, and opposite end walls; a substantially rectangular open frame hinged to the bottom wall of the case for swinging movement toward the same into engagement with the rear wall thereof and away therefrom into open position, said frame when moved to closed position covering the front of the case and overlapping the top wall thereof; a substantially rectangular mirror unit swingably mounted within the frame and rotatable about a transverse axis located substantially intermediate the ends thereof, said mirror unit normally closing the front of the case and having two oppositely facing reflective surfaces of different reflecting values; manually operable means carried by the frame and connected to the mirror unit for substantially simultaneously disengaging the frame from the case, rotating the mirror unit within the frame and returning the frame into engagement with the case; means on the case cooperating with said last-named means on the frame for securing said frame in its normally closed position with respect to the case; and means for preventing rotation of the mirror unit within the frame when said frame is in closed position.

3. In a reversible rear view mirror for automobiles and the like, a substantially rectangular supporting case open at the front thereof facing the driver of the automobile and having a bottom wall, a frame hingedly mounted on said bottom wall of said case for movement toward said case into engagement therewith and away therefrom into open position, a mirror unit rotatably and reversibly mounted within the frame and normally closing the front of the case, said mirror unit having two oppositely facing reflective surfaces of different reflecting values, a wall at the rear of the case to shield the mirror unit from light rays emanating from in front of the automobile, means on said rear wall for mounting said case, and manually operable means carried by the frame and connected to the mirror unit for substantially simultaneously disengaging the frame from the case, rotating the mirror unit within the frame and returning the frame into engagement with the case, with the mirror unit closing the front of said case.

4. In a reversible rear view mirror for automobiles and the like, a substantially rectangular supporting case open at the front thereof facing the driver of the automobile and having a bottom wall, a frame hingedly mounted on said bottom wall for movement toward said case into engagement therewith and away therefrom into open position, a mirror unit rotatably and reversibly mounted within the frame and normally closing the front of the case, said mirror unit having two oppositely facing reflective surfaces of different reflecting values, a wall at the rear of the case to shield the mirror unit from light rays emanating from in front of the automobile, means on said rear wall for mounting said case, manually operable means carried by the frame and connected to the mirror unit for substantially simultaneously disengaging the frame from the case, rotating the mirror unit within the frame and returning the frame into engagement with the case, with the mirror unit closing the front of said case, and means for securing the frame in its normally closed position with respect to the case.

5. In a reversible rear view mirror for automobiles and the like, a substantially rectangular supporting case open at the front thereof facing the driver of the automobile and having a bottom wall, a substantially rectangular frame hingedly mounted on said bottom wall for movement toward said case into engagement therewith and away therefrom into open position, a substantially rectangular mirror unit swingably mounted within the frame and rotatable about a transverse axis located substantially intermediate the ends thereof, said mirror unit normally closing the front of the case and having two oppositely facing reflective surfaces of different reflecting values, a wall at the rear of the case to shield the mirror unit from light rays emanating from in front of the automobile, means on said rear wall for mounting said case, and manually operable means carried by the frame and connected to the mirror unit for substantially simultaneously disengaging the frame from the case, rotating the mirror unit within the frame and returning the frame into engagement with the case, with the mirror unit closing the front of said case.

6. In a reversible rear view mirror for automobiles and the like, a substantially rectangular supporting case open at the front thereof facing the driver of the automobile and having a bottom wall, a substantially rectangular frame hingedly mounted on said bottom wall for movement toward said case into engagement therewith and away therefrom into open position, a substantially rectangular mirror unit swingably mounted within the frame and rotatable about a transverse axis located substantially intermediate the ends thereof, said mirror unit normally closing the front of the case and having two oppositely facing reflective surfaces of different reflecting values, a wall at the rear of the case to shield the mirror unit from light rays emanating from in front of the automobile, means on said rear wall for mounting said case, manually operable means carried by the frame and connected to the mirror unit for substantially simultaneously disengaging the frame from the case, rotating the mirror unit within the frame and returning the frame into engagement with the case, with the mirror unit closing the front of said case, and means for preventing rotation of the mirror unit within the frame when said frame is in its normally closed position with respect to the case.

7. In a reversible rear view mirror for automobiles and the like, a substantially rectangular unitary supporting case open at the front thereof facing the driver of the vehicle and having a substantially flat and rectangular rear wall, means on said rear wall for mounting said case, a forwardly directed peripheral flange comprising a top wall, bottom wall and opposite end walls attached to said rear wall, an open frame hinged to said bottom wall for swinging movement toward the case into engagement with the rear wall of the case and away therefrom into open position, said frame when moved to closed position covering the front of the case and overlapping the top wall thereof, a mirror unit rotatably and reversibly mounted within the frame and normally closing the front of the case, said mirror unit having two oppositely facing reflective surfaces of different reflecting values, said rear wall being positioned to shield said reflective surfaces of said mirror unit from light rays emanating from in front of the automobile, and means carried by the frame and connected to the mirror unit for substantially simultaneously disengaging the frame from the case, rotating the mirror unit within the frame and returning the frame into engagement with the case, with the mirror unit closing the front of said case.

8. In a reversible rear view mirror for automobiles and the like, a substantially rectangular unitary supporting case open at the front thereof facing the driver of the vehicle and having a rear wall, means on said rear wall for mounting said case, a forwardly directed peripheral flange comprising a top wall, bottom wall and opposite end walls attached to said rear wall, an open frame hinged to said bottom wall for swinging movement toward the case into engagement with the rear wall of the case and away therefrom into open position, said frame when moved to closed position covering the front of the case and overlapping the top wall thereof, a mirror unit rotatably and reversibly mounted within the frame and normally closing the front of the case, said mirror unit having two oppositely facing reflective surfaces of different reflecting values, said rear wall being positioned with respect to said mirror unit to shield said reflective surfaces of said mirror unit from light rays emanating from in front of the automobile, means carried by the frame and connected to the mirror unit for substantially simultaneously disengaging the frame from the case, rotating the mirror unit within the frame and returning the frame into engagement with the case, with the mirror unit closing the front of said case, means on the case cooperating with said last-named means on the frame for securing said frame in its normally closed position with respect to the case, and means for preventing rotation of the mirror unit within the frame when said frame is in closed position.

References Cited in the file of this patent

UNITED STATES PATENTS

| | | |
|---|---|---|
| 112,474 | Mason | Mar. 7, 1871 |
| 1,503,378 | Reid | July 29, 1924 |
| 1,763,550 | Beauchamp | June 10, 1930 |
| 2,087,531 | Sands | July 20, 1937 |
| 2,307,532 | Murphy | Jan. 5, 1943 |